April 2, 1968 D. A. BANGE ET AL 3,375,962

RECORD MEDIA HANDLING APPARATUS

Filed Oct. 20, 1965

INVENTORS
DONALD A. BANGE &
ROBERT M. STERNBERG

BY Louis A. Kline
Albert L. Sessler, Jr.

THEIR ATTORNEYS

United States Patent Office 3,375,962
Patented Apr. 2, 1968

3,375,962

RECORD MEDIA HANDLING APPARATUS

Donald A. Bange and Robert M. Sternberg, Dayton, Ohio, assignors to The National Cash Register Company, Dayton, Ohio, a corporation of Maryland Filed Oct. 20, 1965, Ser. No. 498,494
10 Claims. (Cl. 226—176)

ABSTRACT OF THE DISCLOSURE

A record media driving device including a constantly rotating capstan having a pair of annular magnetic elements capable of providing a portion of a magnetic flux path for operating the device; a stationary electromagnetic member having a configuration which substantially surrounds the capstan except for that portion of the capstan which engages the record media to be driven; and a pinch roller which cooperates with the capstan in driving the record media. The pinch roller has an annular magnetic element which is resiliently mounted and which is capable of being drawn toward the capstan by energization of the electromagnetic member.

The present invention relates generally to high-speed record media handling apparatus, and more particularly to a novel driving arrangement for such apparatus.

This invention is capable of handling a number of different types of record media, but for illustrative purposes it will be described primarily as a perforated tape handling device. It will be recognized, however, that other types of record members, such as punched cards, could also be handled by the present invention.

Due to the high operating speed of modern data processing systems, it is important that perforated tape which is used in association with such systems be handled at a high rate of speed for maximum efficiency. Since intermittent tape sensing, with a large number of starts and stops of the motion of the tape, is characteristic of the manner in which information is commonly sensed from perforated tape in such systems, extremely rapid acceleration and deceleration of the tape become of paramount importance.

In order to achieve the desired capability of rapid acceleration and decleration of the tape, a number of problems must be resolved, among which are mechanical inertia of the operating parts; passage of repaired tape sections, such as splices, through the tape handling apparatus; and the possibility of tape breakage due to the high stresses imposed upon the tape.

Driving means employing constantly rotating capstans and magnetically controlled pinch rollers, between which the tape is pressed for driving, have been developed to provide the desired rapid tape acceleration. One such driving means is shown in U.S. Patent No. 3,158,305, issued on Nov. 24, 1964, to Cebern B. Trimble, and employs a continuously rotating capstan, having an electromagnetic coil contained within said capstan, which is capable, when energized, of attracting a pinch roller toward the capstan, to squeeze the tape between the capstan and the pinch roller and thereby drive it. A second driving means is shown in U.S. Patent No. 3,100,591, issued Aug. 13, 1963, to Cebern B. Trimble, and employs a stationary electromagnet and two constantly rotating annular members, one of which contains a magnetic element. When the electromagnet is energized, the annular member containing the magnetic element is drawn toward the electromagnet, and thereby toward the other annular member, which is positioned between the legs of the electromagnet. The tape, which is located between the two constantly rotating annular members, is thus gripped and driven.

The present invention furnishes additional improvements by eliminating the slip rings required for the electromagnetic capstan of U.S. Patent No. 3,158,305, while at the same time providing an automatic adjustment for wear of the capstan and pinch roller which is not found in the previously-mentioned U.S. Patent No. 3,100,591. In addition, a configuration is provided which maximizes the effective magnetic flux density in the flux path used to operate the driving means, and which is relatively simple to fabricate, and efficient and relatively maintenance-free in operation.

The novel driving means of the present invention includes a constantly rotating capstan containing a plurality of annular magnetic elements capable of providing a portion of a magnetic flux path for operating the driving means; a stationary electromagnetic member having a configuration which substantially surrounds the capstan except for the portion of the capstan which engages the tape to be driven; and a pinch roller adapted to cooperate with the capstan in driving the tape, said pinch roller having an annular magnetic element resiliently mounted and capable of being drawn toward the capstan by energization of the electromagnetic member to produce a flux path which extends through the magnetic elements of the capstan and the pinch roller.

Due to the resilient mounting of the pinch roller, when the electromagnetic member is not energized, the tape to be driven lies between the capstan and the pinch roller, with relatively little or no pressure being applied to said tape, and thus is not driven even though both the capstan and the pinch roller are constantly rotating. Energization of the electromagnetic member generates flux in a path extending through the magnetic elements of the capstan and the pinch roller, drawing the capstan and the pinch roller together to squeeze the tape therebetween, and to cause it to be driven by the opposite rotations of the capstan and the pinch roller.

Usually a tape handling device employing the tape drive means of the present invention will also include a braking means, which can be operated in conjunction with the tape driving means, so that initiation of operation of the tape driving means also releases the braking means, and vice versa. It may further be desired to include in the tape handling device a capability to drive the tape in two opposite directions, in which case two driving means and two braking means may be employed, as shown in the illustrated embodiment of the present invention.

Accordingly, it is an object of the present invention to provide record media handling apparatus capable of controlling the movement of record media, in association with means for utilizing information contained on said media, rapidly and effectively in response to control signals applied from some outside source.

A further object is to provide record media handling apparatus capable of accelerating record media rapidly from a halted condition to a desired speed, and of driving said record media effectively.

An additional object is to provide novel electromagnetically controlled record media driving means.

Another object is to provide record media driving means including electromagnetic control means and first and second oppositely rotating means through which a magnetic flux path may be completed to bring said rotating means into record media driving relation when the electromagnetic means is energized.

Still another object is to provide record media driving means comprising a capstan including a pair of annular elements of magnetic material, an electromagnetic member including a pair of pole-pieces substantially surrounding the capstan circumferentially and positioned opposite the pair of annular elements, said electromagnetic member having a coil for energizing said electromagnetic element, and a pinch roller including a resiliently mounted annular element of magnetic material.

With these and incidental objects in view, the invention includes certain novel features of construction and combinations of parts, a preferred form or embodiment of which is hereinafter described with reference to the drawing which accompanies and forms a part of this specification.

Figure 1:
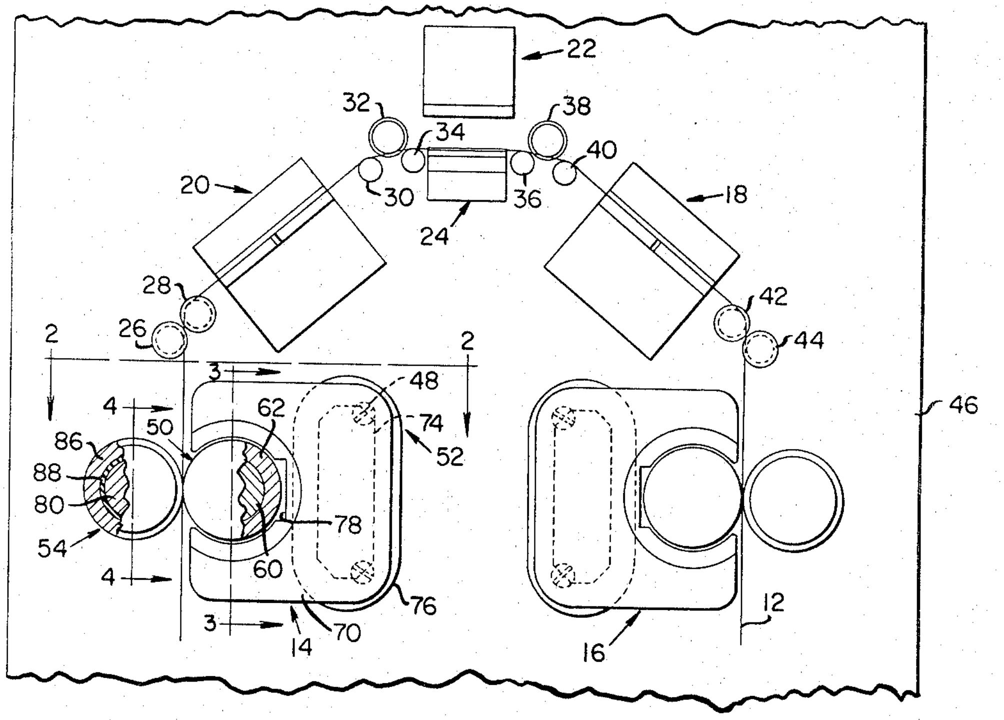
FIG. 1 is a side elevation of a tape handling apparatus, showing a pair of driving means for driving the tape in either of two opposite directions, a pair of brake means associated with the driving means for controlling movement of the tape, a reading station for sensing information from the tape, and a plurality of idler rolls for guiding the movement of the tape.
Figure 2:
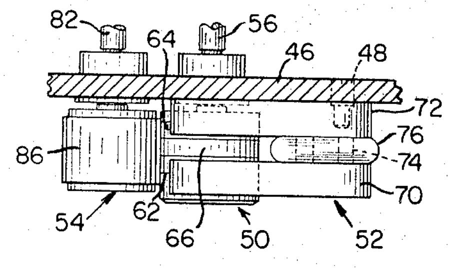
FIG. 2 is a sectional view taken on line 2—2 of FIG. 1, showing the electromagnetic member, the capstan, and the pinch roller which make up one of the driving means.

In the partially diagrammatic view of FIG. 1, the record media, shown as perforated tape 12, is adapted to be driven in a first direction by a driving means shown generally at 14, and in an opposite direction by a driving means shown generally at 16. A first brake, shown generally at 18, cooperates with the driving means 14, while a second brake, shown generally at 20, cooperates with the driving means 16. A reading station, comprising a light source 22 cooperating with a sensing means 24, between the tape 12 passes, functions to sense information from the tape for transmission to some appropriate utilizing device. A number of idler rolls 26, 28, 30, 32, 34, 36, 38, 40, 42, and 44 are provided to control the movement of the tape between the other elements. All of the elements described above are mounted on a support 46 by suitable means. While the illustrated embodiment shows a device having two driving means and two brakes for controlling movement of the tape in both directions, it will be obvious to one skilled in the art that this is merely illustrative and that other arrangements could be provided, such as one driving means and one brake for movement of the tape in only one direction.

The brakes 18 and 20, the light source 22, and the sensing means 24 may be of any suitable conventional construction, as shown, for example, in U.S. Patent No. 2,864,609, issued Dec. 16, 1958, to Cebern B. Trimble.

The driving means 14 and 16 are of identical construction, and therefore only the driving means 14 will be described in detail. Included in the driving means are three basic elements; namely, a capstan 50, an electromagnetic element 52, and a pinch roller 54.

The capstan 50 is an element of cylindrical configuration having an outer circumferential surface which is located adjacent to one side of the tape 12. At one end, the capstan is provided with an integral shaft 56 (FIG. 3) of reduced diameter, which shaft cooperates with suitable bearings 58 for rotatably mounting the capstan in the support member 46. An electric motor or other appropriate means (not shown) is provided to drive the capstan in constant rotational movement during operation of the tape handling device.

Figure 3:
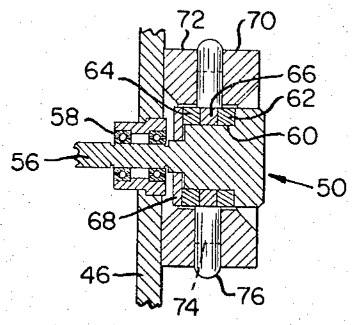
FIG. 3 is a sectional view, taken on line 3—3 of FIG. 1, showing the capstan and the electromagnetic element.

As may best be seen in FIG. 3, the central portion 60 of the capstan, of which portion the shaft 56 is a part, also has a section of somewhat reduced diameter, on which are positioned two annular elements or rings 62 and 64 of magnetic material, which are separated by an annular spacer 66 of non-magnetic material. An end member 68 completes the assembly of the capstan and retains the elements 62, 64, and 66 in proper position on the central portion 60.

Cooperating with the capstan 50 as a part of the driving means 14 is the electromagnetic member 52, which consists of a pair of pole pieces 70 and 72 connected by a member 74, on which is wound an electromagnetic coil 76. The electromagnetic member 52 is fixed to the support member 46 by screws 48 or other suitable fastening means.

As may best be seen in FIG. 1, the pole pieces 70 and 72 are shaped in a configuration which extends around the greater portion of the circumference of the capstan 50. Each of the pole pieces 70 is positioned in alignment with one of the annular magnetic elements or rings 62 and 64 of said capstan. Also, as is best shown in FIG. 3, the pole pieces 70 and 72 are reduced in cross-sectional width at the points of closest proximity to the rings 62 and 64 of the capstan 50. The shape thus defined by each pole piece is designed to provide the maximum flux coupling and flux concentration between the pole pieces 70 and 72 and the rings 62 and 64, with which they are associated. In addition, it may be noted that a portion of each pole piece 70 and 72 is cut away at 78. This is done to balance the magnetic attraction between the capstan and the pole pieces 70 and 72. The upper and lower attractions between the pole pieces and the rings 62 and 64 of the capstan are approximately equal and cancel each other, but, if there were not a cut-out portion 78, the pole pieces 70 and 72 would tend to draw the capstan to the right as viewed in FIG. 1, since there is no counterbalancing attractive force to the left of the capstan as shown in FIG. 1.

The pole pieces 70 and 72 may be made from any suitable magnetic material. This may include a solid magnetic steel, a laminated magnetic steel construction, or a composition or particles of magnetic material such as electrolytic iron in a suitable binder, such as epoxy resin. In the last-named composition, the iron particles may be of random size, of approximately 150 microns diameter and smaller. This material is advantageous in that is minimizes eddy-current losses, thus facilitating rapid buildup of magnetic flux when the coil 76 is energized, for fast operation of the driving means.

Figure 4:
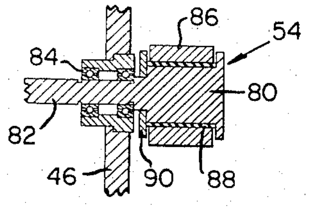
FIG. 4 is a sectional view, taken on line 4—4 of FIG. 1, showing the pinch roller.

As shown in sectional detail in FIG. 4, the pinch roller 54 includes a central portion 80 having an integral shaft 82 of reduced diameter, which cooperates with bearings 84 for rotatably mounting the pinch roller in the support member 46. An electric motor or other appropriate means (not shown) is provided to drive the pinch roller in constant rotational movement during operation of the tape handling device. It will be recognized that the capstan 50 and the pinch roller 54 are driven in opposite directions of rotation, and that this can conveniently be accomplished through use of a single electric motor and a suitable belt and pulley or gear arrangement.

Resiliently mounted on the central portion 80 of the pinch roller 54 is an annular element 86 of magnetic material. The resilient mounting may take the form of a sleeve or layer 88 of rubber or other resilient material positioned in a press fit between the central portion 80 and the annular element 86, although other suitable means of mounting may be employed. The annular element 86 is retained on the central portion by an enlargement at one end of said central portion, and by a retaining member 90 at the other end thereof.

It will be apparent from an examination of FIG. 1 that the outer surface of the annular element 86 of the pinch roller 54 is adjacent to and engageable with one side of the tape 12 at a point opposite where the outer surface of the capstan 50 engages the other side of said tape. When the coil 76 of the electromagnetic element 52 is not energized, the capstan 50 and the pinch roller 54 do not press or squeeze the tape 12 sufficiently to drive it, even though the capstan 50 and the pinch roller 54 are constantly rotating.

However, when the electromagnetic coil 76 is energized through suitable electrical control means, which do not form a part of this invention, but which are well known, magnetic flux is generated and follows a path which includes the following elements: the pole piece 70, the annular element 62 of the capstan, the annular element 86 of the pinch roller, the annular element 64 of the capstan, the pole piece 72, and the member 74. It may be noted that suitable electrical control means for controlling the operation of a single driving means and braking means are shown in the previously mentioned Trimble U.S. Patents Nos. 2,864,609, 3,100,591, and 3,158,305. Adaptation of such control means to operate the bidirectional drive shown and described in the illustrated embodiment of the present invention would be obvious to one skilled in the art.

The flux generated in the path described above causes the attraction of the element 86 to the elements 62 and 64 of the driving means 14. Because of its resilient mounting, the element 86 is capable of shifting slightly in a direction toward the capstan 50 while both continue to rotate, thereby gripping the tape 12 therebetween and imparting a driving movement to the left, as viewed in FIG. 1, to said tape. This driving movement continues so long as the flux is maintained by energization of the coil 76. Deenergization of said coil permits the element 86 to return to its position in which the tape 12 is no longer gripped between the capstan and the pinch roller with sufficient force to cause it to be driven. Normally the brake 18 is energized at the same time that the coil 76 is deenergized, thus positively halting the movement of the tape 12. Driving of the tape 12 to the right as viewed in FIG. 1 is accomplished by energization of the electromagnetic coil of the driving means 16.

As indicated earlier, one important advantage of the present invention is that flux is provided in the elements 62 and 64 of the capstan without the need for using an electromagnet therein and without the consequent need for slip rings to impart electrical energy to the rotating capstan. Another important advantage is that the driving means of the present invention is self-adjusting for wear, since only the capstan and the pinch roller are subject to substantial wear, and these are drawn to each other by the magnetic force generated by the coil 76, regardless of said wear, with the thickness of the tape 12 determining the actual distance between them when they are in operative relation with respect to each other.

While the form of the invention shown and described herein is admirably adapted to fulfill the objects primarily stated, it is to be understood that it is not intended to confine the invention to the form or embodiment disclosed herein, for the invention is susceptible of embodiment in various other forms within the scope of the appended claims.

What is claimed is:

1. In a record media handling apparatus for controlling the movement of record media, the combination comprising a capstan which is continuously driven during operation of the apparatus, having a cylindrical surface normally adjacent to one side of record media which is to be driven, and including at least one magnetic element having an outer surface which forms part of said cylindrical surface;

a stationary electromagnetic control member including an energizing means, and having at least one inner surface which is concentric with, but slightly spaced from, a major portion of the total circumference of the cylindrical surface of the capstan; and a pinch roller which is continuously driven during operation of the apparatus, including an axial portion, resilient intermediate means, and an annular outer element of magnetic material, said annular outer element having a cylindrical surface normally adjacent to the other side of the record media and being resiliently mounted by means of said resilient intermediate means on said axial portion to permit movement of said annular element toward the record media in a direction perpendicular to the axis of rotation of said pinch roller in response to magnetic attraction between the magnetic elements of the capstan and the pinch roller when the stationary electromagnetic control member is energized by its energizing means.

2. The apparatus of claim 1, in which the energizing means of the stationary electromagnetic control member is an electromagnetic coil.

3. The apparatus of claim 1, in which the magnetic element of the capstan is of annular configuration.

4. The apparatus of claim 1, in which the capstan includes two of said magnetic elements.

5. The apparatus of claim 4, in which the two magnetic elements are maintained in separated relationship by an annular spacer element.

6. The apparatus of claim 4, in which the stationary electromagnetic control member includes two pole pieces which are positioned opposite the two magnetic elements of the capstan, each pole piece having an inner surface which is concentric with, but slightly spaced from, a major portion of the total circumference of the cylindrical surface of the capstan.

7. The apparatus of claim 6, in which the inner surfaces of the two pole pieces have cut-away portions located furthest away from the point at which the capstan is closest to the record media.

8. The apparatus of claim 6, in which at least one edge of the inner surface of each pole piece is chamfered for flux concentration purposes.

9. The apparatus of claim 6, in which the energizing means of the stationary electromagnetic control member is an electromagnetic coil positioned between the two pole pieces.

10. The apparatus of claim 6, in which the two pole pieces are made from a composition of iron particles in a binder.

References Cited

FOREIGN PATENTS 1,166,523 3/1964 Germany.

ALLEN N. KNOWLES, *Primary Examiner.*